(12) United States Patent
Clevorn

(10) Patent No.: US 9,398,575 B2
(45) Date of Patent: Jul. 19, 2016

(54) COMMUNICATION TERMINAL AND A METHOD FOR REPORTING A CHANNEL QUALITY

(71) Applicant: Intel IP Corporation, Santa Clara, CA (US)

(72) Inventor: Thorsten Clevorn, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/593,024

(22) Filed: Jan. 9, 2015

(65) Prior Publication Data
US 2015/0230237 A1 Aug. 13, 2015

(30) Foreign Application Priority Data
Feb. 11, 2014 (DE) .................. 10 2014 101 659

(51) Int. Cl.
*H04W 88/02* (2009.01)
*H04W 72/04* (2009.01)
*H04W 72/08* (2009.01)
*H04L 1/00* (2006.01)
*H04W 24/00* (2009.01)

(52) U.S. Cl.
CPC ............ *H04W 72/0413* (2013.01); *H04L 1/00* (2013.01); *H04W 24/00* (2013.01); *H04W 72/085* (2013.01); *H04W 88/02* (2013.01)

(58) Field of Classification Search
CPC ... H04W 72/00; H04W 72/04; H04W 72/042; H04W 72/08; H04W 72/085; H04W 72/087; H04W 88/00; H04W 88/02; H04W 28/08; H04W 28/10; H04W 28/12; H04W 24/02; H04W 24/04; H04W 24/10; H04W 16/08

USPC ............ 455/452.1, 452.2, 453; 370/235, 232, 370/233, 234
See application file for complete search history.

(56) References Cited

U.S. PATENT DOCUMENTS

| | | | | |
|---|---|---|---|---|
| 5,852,630 A | * | 12/1998 | Langberg | H04L 27/2647 375/219 |
| 2005/0250510 A1 | * | 11/2005 | Kaikkonen | H04W 48/16 455/452.2 |
| 2009/0287970 A1 | | 11/2009 | Iizuka et al. | |
| 2011/0021224 A1 | * | 1/2011 | Koskinen | H04W 72/005 455/507 |
| 2011/0206098 A1 | | 8/2011 | Lindoff et al. | |
| 2012/0044809 A1 | * | 2/2012 | Battiston | H04L 1/0002 370/235 |
| 2012/0140634 A1 | | 6/2012 | Thierion | |
| 2012/0300827 A1 | | 11/2012 | Chung | |
| 2013/0201834 A1 | * | 8/2013 | Klingenbrunn | H04W 28/12 370/236 |
| 2014/0241177 A1 | * | 8/2014 | Wang | H04W 24/02 370/252 |
| 2015/0223161 A1 | * | 8/2015 | Xiao | H04B 7/0417 370/329 |

FOREIGN PATENT DOCUMENTS

| | | |
|---|---|---|
| CN | 101378584 A | 3/2009 |
| EP | 1605641 A1 | 12/2005 |
| WO | 2013044482 A1 | 4/2013 |

* cited by examiner

*Primary Examiner* — Siu Lee

(57) ABSTRACT

A communication terminal comprising a determiner configured to determine whether a communication service used by the communication terminal via a communication channel is of a predetermined class and to determine a channel quality of the communication channel to be indicated to a communication network based on whether the communication service is of the predetermined class and a transmitter configured to indicate the channel quality to the communication network.

18 Claims, 7 Drawing Sheets

COMMUNICATION TERMINAL AND A METHOD FOR REPORTING A CHANNEL QUALITY

CROSS-REFERENCE TO RELATED APPLICATION

This application claims priority to German Patent Application Serial No. 10 2014 101 659.9, which was filed Feb. 11, 2014, and is incorporated herein by reference in its entirety.

TECHNICAL FIELD

Embodiments described herein generally relate to a communication terminal and a method for reporting a channel quality.

BACKGROUND

Voice or speech quality is typically one of the major key performance indicators for telephones. However communication networks may set communication parameters for throughput optimization which are not optimal for real-time communication services such as speech data transmission. For example, while a relatively high BLER (block error rate) of e.g. 10% may be optimal in terms of throughput, voice quality may suffer from this high BLER, e.g. due to the caused delay of data packets. Accordingly, approaches to increase voice or speech quality, or generally the quality of communication services for which factors besides throughput, e.g. a low BLER, are of importance, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

For reasons of simplicity, in the following, explanations will be given using a mobile communication standard or radio access technology, such as LTE according to 3GPP ($3^{rd}$ Generation Partnership Project) and the corresponding entities (e.g. E-UTRAN, EPC and UE), however, it is to be noted that various aspects may also be provided using another cellular wide area radio communication technology or other radio access technologies (such as Bluetooth, WLAN or DECT) and its corresponding entities and corresponding nomenclature as will be described in more detail below.

Figure 1:
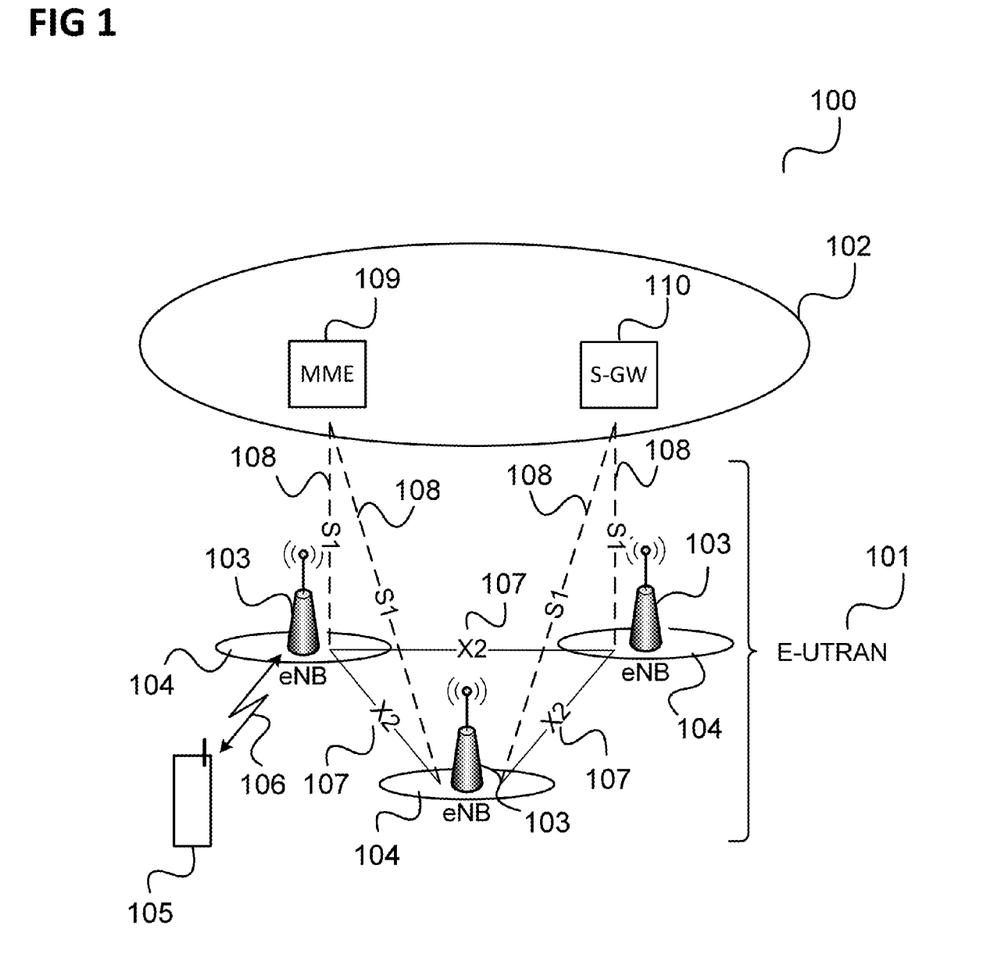
FIG. 1 shows a communication system according to a mobile communication standard, such as LTE.

FIG. 1 shows an exemplary communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 may be interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of a mobile communication standard, such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Voice or speech quality is typically still one of the major key performance indicators for telephones, e.g. a mobile phone used as the mobile terminal 105, because it can be directly experienced by the end user and is measurable (i.e. audible) for the end user.

The best voice quality is usually achieved if there are no packet errors or delay, i.e. no voice packet that is generated is lost or delayed in the transmission to the receiver. However, to optimize the network capacity live networks usually target e.g. a packet loss rate (block error rate, BLER) of 10%. With retransmissions (e.g. by usage of a hybrid automatic repeat request HARQ method) every packet may in the end be received correctly, but a retransmission implies a delay. Moreover, in case retransmissions are disabled, every packet loss on the radio link results directly in an audio packet loss. Further, the abovementioned target of 10% BLER optimizes network capacity only under certain conditions, e.g. a fully loaded network. Thus, in a network which is not loaded a different strategy may be useful.

In the following, a communication terminal is described that may for example allow increasing voice quality for a voice call or more generally the quality of a communication service for which factors besides throughput, e.g. a low BLER, are of importance.

Figure 2:
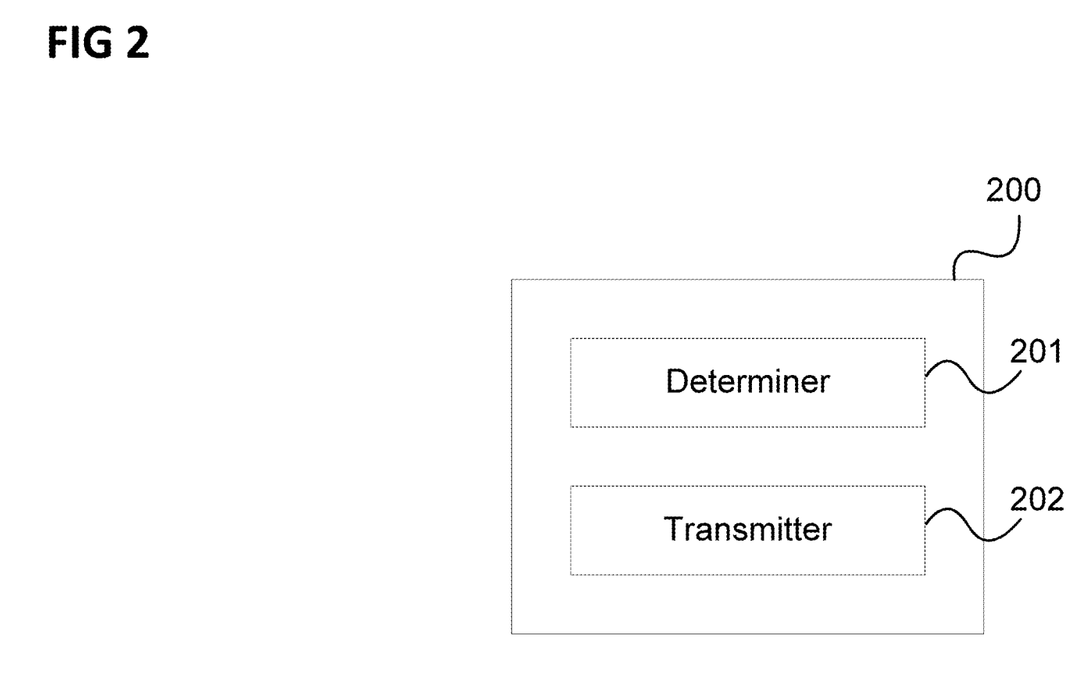
FIG. 2 shows a communication terminal.

FIG. 2 shows a communication terminal 200.

The communication terminal 200 comprises a determiner 201 configured to determine whether a communication service used by the communication terminal via a communication channel is of a predetermined class (or in other words, of a predetermined type) and to determine a channel quality of the communication channel to be indicated to a communication network based on whether the communication service is of the predetermined class.

The communication terminal 200 further comprises a transmitter 202 configured to indicate the channel quality to the communication network.

In other words, a communication terminal reports a channel quality of a communication channel depending on the communication service for which the communication channel is used. For example, in case the communication service is a voice call, the communication terminal may report a lower channel quality than the actual channel quality. The communication channel quality is for example a physical communication channel. The transmitter indicates the channel quality for example as the quality of the (e.g. physical) channel as experienced by the communication terminal (e.g. a receiver of the communication terminal). The determiner for example determines the channel quality in the form of a quality value.

For example, voice quality of a voice call may be improved in certain scenarios by a smart strategy to depart or work around a target BLER (e.g. of 10%). The communication terminal may report a reduced channel quality such that a BLER of lower than (for example) 10% is achieved. It should be noted that this may have impact on the throughput of the communication channel. However, for example for a voice call, throughput requirements are relatively low.

It should be noted that such an approach may also be useful for other classes of communication services than voice calls, for example any real-time communication service with relatively low requirements regarding throughput but high requirements regarding packet error rate or delay, e.g. video conferencing (provided that the throughput requirements for the video are not to high), Internet radio and other classes of real-time data transmission.

Figure 3:
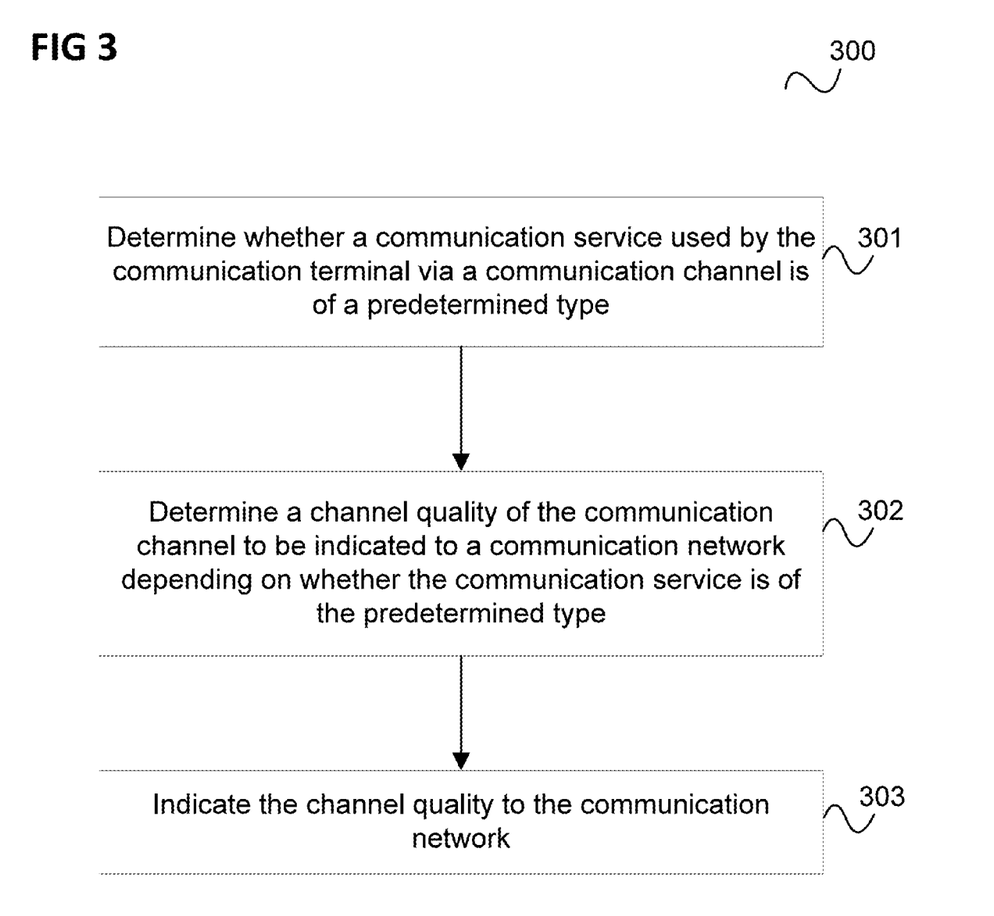
FIG. 3 shows a flow diagram illustrating a method for reporting a channel quality, for example carried out by a communication terminal.

The communication terminal for example carries out a method as illustrated in FIG. 3.

FIG. 3 shows a flow diagram 300 illustrating a method for reporting a channel quality, for example carried out by a communication terminal.

In 301, the communication terminal determines whether a communication service used by the communication terminal via a communication channel is of a predetermined class.

In 302, the communication terminal determines a channel quality of the communication channel to be indicated to a communication network based on whether the communication service is of the predetermined class.

In 303, the communication terminal indicates the channel quality to the communication network.

The following examples pertain to further embodiments

Example 1 is a communication terminal as illustrated in FIG. 3.

In Example 2, the subject matter of Examples 1 can optionally include can optionally include the transmitter being configured to indicate the channel quality to the communication network by transmitting a channel quality indicator corresponding to the channel quality.

In Example 3, the subject matter of any one of Examples 1-2 can optionally include the transmitter being configured to indicate the channel quality to the communication network by transmitting acknowledgement messages at a rate corresponding to the channel quality.

In Example 4, the subject matter of any one of Examples 1-3 can optionally include the transmitter being configured to indicate the channel quality to the communication network by transmitting negative acknowledgement messages for data packets or omitting acknowledgement messages and negative acknowledgement messages for data packets at a rate corresponding to the channel quality.

In Example 5, the subject matter of any one of Examples 1-4 can optionally include the determiner being configured to determine the channel quality based on a candidate channel quality, wherein, if the communication service is of the predetermined class, the determiner reduces the candidate channel quality and determines the reduced candidate channel quality as the channel quality.

In Example 6, the subject matter of any one of Examples 1-5 can optionally include the communication service being of the predetermined class if the data communicated by the communication service is of a predetermined data type.

In Example 7, the subject matter of Example 6 can optionally include the predetermined data type including speech data.

In Example 8, the subject matter of any one of Examples 1-7 can optionally include the communication service being of the predetermined class if the data communicated by the communication service is real-time data.

In Example 9, the subject matter of any one of Examples 1-8 can optionally include the predetermined class being a network layer or higher layer service class.

In Example 10, the subject matter of any one of Examples 1-9 can optionally include the predetermined class being a transport layer or higher layer service class.

In Example 11, the subject matter of any one of Examples 1-10 can optionally include the predetermined class being the class of real-time data transmission services.

In Example 12, the subject matter of any one of Examples 1-11 can optionally include the predetermined class being the class of speech or voice data transmission services.

In Example 13, the subject matter of any one of Examples 1-12 can optionally include the predetermined class being the class of voice calls.

In Example 14, the subject matter of any one of Examples 1-13 can optionally include the predetermined class being a class of latency sensitive communication services.

In Example 15, the subject matter of any one of Examples 1-14 can optionally include the predetermined class being a class of latency sensitive communication services.

In Example 16, the subject matter of any one of Examples 1-15 can optionally include the predetermined class being a class of error rate sensitive communication services.

In Example 17, the subject matter of any one of Examples 1-16 can optionally include the communication channel being provided by the communication network.

In Example 18, the subject matter of any one of Examples 1-17 can optionally include the determiner being further configured to determine a load of the communication network and to determine the channel quality of the communication channel to be indicated to the communication network based on the load of the communication network.

In Example 19, the subject matter of any one of Examples 1-18 can optionally include the determiner being further configured to determine a load of the communication network and to determine the channel quality of the communication channel to be indicated to the communication network based on whether the load of the communication network is below a predetermined threshold.

In Example 20, the subject matter of any one of Examples 1-19 can optionally include the determiner being configured to determine the channel quality based on a candidate channel quality, wherein, if the load of the communication network is below the predetermined threshold, the determiner reduces the candidate channel quality and determines the reduced candidate channel quality as the channel quality.

In Example 21, the subject matter of any one of Examples 1-20 can optionally be a mobile phone.

In Example 22, the subject matter of any one of Examples 1-21 can optionally include the transmitter being configured to indicate the channel quality to the communication network in a first way, the determiner being further configured to determine whether the communication network operates the communication channel in accordance with the indicated channel quality and the transmitter being further configured, if the communication network does not operate the communication channel in accordance with the indicated channel quality, to further indicate the channel quality to the communication network in a second way different from the first way.

In Example 23, the subject matter of Examples 22 can optionally include the determiner being configured to determine whether the communication network operates the communication channel in accordance with the indicated channel quality by determining whether the communication networks sets a modulation and coding scheme for the communication channel according to the indicated channel quality.

In Example 24, the subject matter of any one of Examples 1-23 can optionally include the transmitter being configured to indicate the channel quality to the communication network by transmitting a channel quality indicator corresponding to the channel quality, the determiner being further configured to determine whether the communication network operates the communication channel in accordance with the indicated channel quality and the transmitter being further configured, if the communication network does not operate the communication channel in accordance with the indicated channel quality, to further indicate the channel quality to the communication network by transmitting negative acknowledgement messages corresponding to the channel quality.

Figure 4:
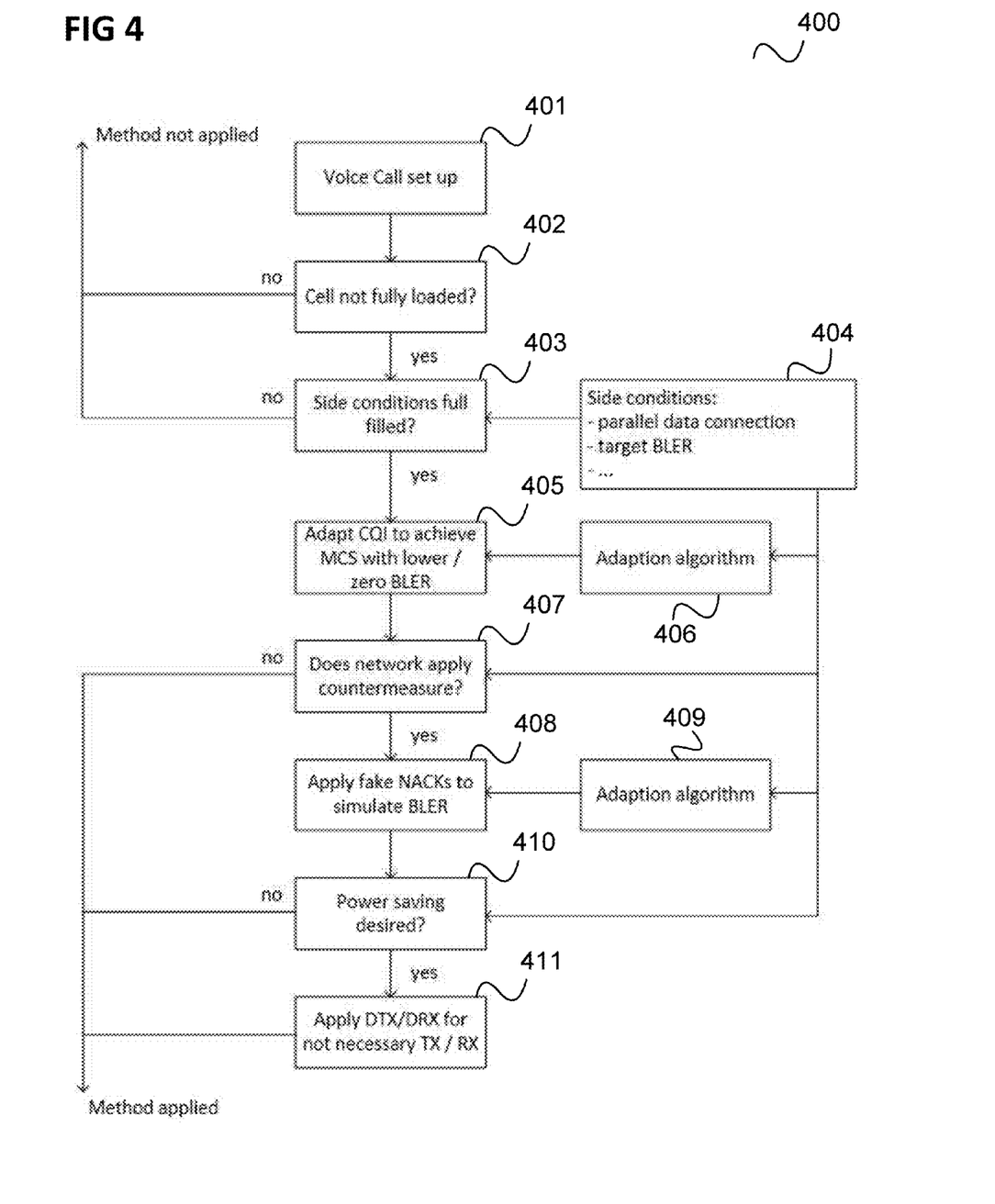
FIG. 4 shows a flow diagram illustrating an example for a method for reporting a channel quality to a communication network.

Example 25 is a method for reporting a channel quality as illustrated in FIG. 4.

In Example 26, the subject matter of Example 25 can optionally include indicating the channel quality to the communication network by transmitting a channel quality indicator corresponding to the channel quality.

In Example 27, the subject matter of any one of Examples 25-26 can optionally include indicating the channel quality to the communication network by transmitting negative acknowledgement messages at a rate corresponding to the channel quality.

In Example 28, the subject matter of any one of Examples 25-27 can optionally include indicating the channel quality to the communication network by transmitting negative acknowledgement messages for data packets or omitting acknowledgement messages and negative acknowledgement messages for data packets at a rate corresponding to the channel quality.

In Example 29, the subject matter of any one of Examples 25-28 can optionally include determining the channel quality based on a candidate channel quality, wherein, if the communication service is of the predetermined class, determining the channel quality comprises reducing the candidate channel quality and determining the reduced candidate channel quality as the channel quality.

In Example 30, the subject matter of any one of Examples 25-29 can optionally include the communication service being of the predetermined class if the data communicated by the communication service is of a predetermined data type.

In Example 31, the subject matter of Examples 30 can optionally include the predetermined data type including speech data.

In Example 32, the subject matter of any one of Examples 25-31 can optionally include the communication service being of the predetermined class if the data communicated by the communication service is real-time data.

In Example 33, the subject matter of any one of Examples 25-32 can optionally include the predetermined class being a network layer or higher layer service class.

In Example 34, the subject matter of any one of Examples 25-33 can optionally include the predetermined class being a transport layer or higher layer service class.

In Example 35, the subject matter of any one of Examples 25-34 can optionally include the predetermined class being the class of real-time data transmission services.

In Example 36, the subject matter of any one of Examples 25-35 can optionally include the predetermined class being the class of speech or voice data transmission services.

In Example 37, the subject matter of any one of Examples 25-36 can optionally include the predetermined class being the class of voice calls.

In Example 38, the subject matter of any one of Examples 25-37 can optionally include the predetermined class being a class of latency sensitive communication services.

In Example 39, the subject matter of any one of Examples 25-38 can optionally include the predetermined class being a class of latency sensitive communication services.

In Example 40, the subject matter of any one of Examples 25-39 can optionally include the predetermined class being a class of error rate sensitive communication services.

In Example 41, the subject matter of any one of Examples 25-40 can optionally include the communication channel being provided by the communication network.

In Example 42, the subject matter of any one of Examples 25-41 can optionally include determining a load of the communication network and determining the channel quality of the communication channel to be indicated to the communication network based on the load of the communication network.

In Example 43, the subject matter of any one of Examples 25-42 can optionally include determining a load of the communication network and determining the channel quality of the communication channel to be indicated to the communication network based on whether the load of the communication network is below a predetermined threshold.

In Example 44, the subject matter of Examples 43 can optionally include determining the channel quality based on a candidate channel quality, wherein, if the load of the communication network is below the predetermined threshold, determining the channel quality comprises reducing the candidate channel quality and determining the reduced candidate channel quality as the channel quality.

In Example 45, the subject matter of any one of Examples 25-44 can optionally be performed by a mobile phone.

In Example 46, the subject matter of any one of Examples 25-45 can optionally include indicating the channel quality to the communication network in a first way, determining whether the communication network operates the communication channel in accordance with the indicated channel quality and, if the communication network does not operate the communication channel in accordance with the indicated channel quality, further indicating the channel quality to the communication network in a second way different from the first way.

In Example 47, the subject matter of Examples 46 can optionally include determining whether the communication network operates the communication channel in accordance with the indicated channel quality by determining whether the communication networks sets a modulation and coding scheme for the communication channel according to the indicated channel quality.

In Example 48, the subject matter of any one of Examples 25-47 can optionally include indicating the channel quality to the communication network by transmitting a channel quality indicator corresponding to the channel quality, determining whether the communication network operates the communication channel in accordance with the indicated channel quality and, if the communication network does not operate the communication channel in accordance with the indicated channel quality, further indicating the channel quality to the communication network by transmitting negative acknowledgement messages corresponding to the channel quality.

Example 49 is a computer readable medium having recorded instructions thereon which, when executed by a processor, make the processor perform a method for performing radio communication according to any one of Examples 25 to 48.

Example 50 is a communication terminal comprising a determining means for determining whether a communication service used by the communication terminal via a communication channel is of a predetermined class and for determining a channel quality of the communication channel to be indicated to a communication network based on whether the communication service is of the predetermined class and a transmitting means for indicating the channel quality to the communication network.

In Example 51, the subject matter of Examples 50 can optionally include the transmitting means being for indicating the channel quality to the communication network by transmitting a channel quality indicator corresponding to the channel quality.

In Example 52, the subject matter of any one of Examples 50-51 can optionally include the transmitting means being for indicating the channel quality to the communication network by transmitting negative acknowledgement messages at a rate corresponding to the channel quality.

In Example 53, the subject matter of any one of Examples 50-52 can optionally include the transmitting means is configured to indicate the channel quality to the communication network by transmitting negative acknowledgement messages for data packets or omitting acknowledgement messages and negative acknowledgement messages for data packets at a rate corresponding to the channel quality.

In Example 54, the subject matter of any one of Examples 50-53 can optionally include the determining means being for determining the channel quality based on a candidate channel quality, wherein, if the communication service is of the predetermined class, the determining means reduces the candidate channel quality and determines the reduced candidate channel quality as the channel quality.

In Example 55, the subject matter of any one of Examples 50-54 can optionally include the communication service being of the predetermined class if the data communicated by the communication service is of a predetermined data type.

In Example 56, the subject matter of Examples 55 can optionally include the predetermined data type including speech data.

In Example 57, the subject matter of any one of Examples 50-56 can optionally include the communication service being of the predetermined class if the data communicated by the communication service is real-time data.

In Example 58, the subject matter of any one of Examples 50-57 can optionally include the predetermined class being a network layer or higher layer service class.

In Example 59, the subject matter of any one of Examples 50-58 can optionally include the predetermined class being a transport layer or higher layer service class.

In Example 60, the subject matter of any one of Examples 50-59 can optionally include the predetermined class being the class of real-time data transmission services.

In Example 61, the subject matter of any one of Examples 50-60 can optionally include the predetermined class being the class of speech or voice data transmission services.

In Example 62, the subject matter of any one of Examples 50-61 can optionally include the predetermined class being the class of voice calls.

In Example 63, the subject matter of any one of Examples 50-62 can optionally include the predetermined class being a class of latency sensitive communication services.

In Example 64, the subject matter of any one of Examples 50-63 can optionally include the predetermined class being a class of latency sensitive communication services.

In Example 65, the subject matter of any one of Examples 50-64 can optionally include the predetermined class being a class of error rate sensitive communication services.

In Example 66, the subject matter of any one of Examples 50-65 can optionally include the communication channel is provided by the communication network.

In Example 67, the subject matter of any one of Examples 50-66 can optionally include the determining means being further for determining a load of the communication network and for determining the channel quality of the communication channel to be indicated to the communication network based on the load of the communication network.

In Example 68, the subject matter of any one of Examples 50-67 can optionally include the determining means being further for determining a load of the communication network and for determining the channel quality of the communication channel to be indicated to the communication network based on whether the load of the communication network is below a predetermined threshold.

In Example 69, the subject matter of Examples 68 can optionally include the determining means being for determining the channel quality based on a candidate channel quality, wherein, if the load of the communication network is below the predetermined threshold, the determining means reduces the candidate channel quality and determines the reduced candidate channel quality as the channel quality.

In Example 70, the subject matter of any one of Examples 50-69 can optionally be a mobile phone.

In Example 71, the subject matter of any one of Examples 50-70 can optionally include the transmitting means being for indicating the channel quality to the communication network in a first way, the determining means being further for determining whether the communication network operates the communication channel in accordance with the indicated channel quality and the transmitting means being further, if the communication network does not operate the communication channel in accordance with the indicated channel quality, for further indicating the channel quality to the communication network in a second way different from the first way.

In Example 72, the subject matter of Examples 71 can optionally include the determining means being for determining whether the communication network operates the communication channel in accordance with the indicated channel quality by determining whether the communication networks sets a modulation and coding scheme for the communication channel according to the indicated channel quality.

In Example 73, the subject matter of any one of Examples 50-72 can optionally include the transmitting means being for indicating the channel quality to the communication network by transmitting a channel quality indicator corresponding to the channel quality, the determining means being further for determining whether the communication network operates the communication channel in accordance with the indicated channel quality and the transmitting means being further, if the communication network does not operate the communication channel in accordance with the indicated channel quality, for further indicating the channel quality to the communication network by transmitting negative acknowledgement messages corresponding to the channel quality.

It should be noted that one or more of the features of any of the examples above may be combined with any one of the other examples.

In the followings, examples for the communication terminal 200 and the method described in FIG. 3 are described in more detail.

The examples are described in the context of VoLTE (Voice over LTE) and LTE, but are similarly applicable to other communication standards, e.g. Voice over HSPA/3G, VoIP via LTE, etc.

It should be noted that one or more of the examples given in the following may seem to be not fully standard compliant or to not follow the original intention of the communication standards, but may rather allow optimizing the user experience locally on the UE side in certain scenarios where the standard lacks the possibilities for such an optimization.

The examples described in the following allow improving the audio quality of a voice communication service by a reduced packet error rate or smaller packet delay.

FIG. 4 shows a flow diagram 400 of a method for reporting a channel quality to a communication network.

In 401, a mobile phone, e.g. mobile terminal or UE 105, sets up a communication channel to its serving base station 104 and a voice call via the communication channel.

The radio access network 101 typically has a target BLER which is chosen for an efficient resource usage in a fully loaded network or radio cell. If the serving radio cell 104 of the mobile terminal 105 is not fully loaded, the mobile terminal 105 can try to use the free resources to optimize its performance (e.g. the user experience audio quality).

Accordingly, in 402, the UE 105 detects, as a precondition, whether its serving radio cell 104 is not fully loaded.

The UE 105 may detect this based on power or SNR (or SINR) measurements e.g. of LTE resource elements or an indicator from the network if the respective communication standard specifies such an indicator, a fraction of the active (i.e. allocated) physical resource blocks in the cell etc. The UE 105 may also check the jitter of initial transmissions compared to the 20 ms speech raster in case of a speech communication service such as VoLTE since deviations may be due to competition from other UEs. Further, the UE may check whether mostly the first CCE (Control Channel Element) for PDCCH is used (which is assigned to the UE), or also more often others. Due to competition from other UEs, the rate of non-first positions of CCE being below a threshold allows assuming a rather low network load.

The radio cell 104 being not fully loaded may for example mean that the load of the radio cell 104 is below a predetermined threshold.

If the UE 105 detects that the radio cell 104 is fully loaded, the process is ended and the UE does not apply the voice quality improving method.

If the UE 105 detects that the radio cell 104 is not fully loaded it determines, in 403, whether certain side conditions 404 are fulfilled.

This includes that the UE 105 determines whether the communication service used via the communication channel is of a predetermined class. The predetermined class for example includes communication services that have relatively high requirements regarding a low BLER (e.g. due to having relatively high requirements regarding a low latency), but relatively low requirements regarding throughput.

The side conditions may include one or more further criteria to determine whether the service is suffering from the current BLER. For example the UE may check for buffer underruns of the communication service and use this as a criterion (instead of only the service class). For example, a side condition is that the rate of lost (due to being delayed) speech frames for a speech communication service is above a predetermined threshold.

The UE may also estimate speech degradation e.g. deviation due to error concealment vs. actual speech data (that may arrive a bit later): For example, if a speech packet contains silence, then it does not harm if the packet is dropped. In fact, the network might have known this in advance and therefore may have sent the packet with lower reliability, which is ok in this case. This also works if the packet is lost completely by comparing whether the voice signal of the packet before and after is similar (then concealment works nicely) or different (then concealment cannot predict that change). For example, a side condition is that the speech degradation is above a predetermined threshold.

Other side conditions may for example be that the target BLER applied by the radio access network 101 is indeed higher than a desired BLER with regard to improving voice quality or that the UE 105 does not use a data transmission connection in parallel to the voice call whose throughput would suffer if the BLER was reduced.

If the UE 105 determines that the side conditions 404 are not fulfilled, e.g. that the communication service is not of the predetermined class, the process is ended and the UE does not apply the voice quality improving method.

If the UE 105 determines that the side conditions are fulfilled, the UE, in 405, adapts (i.e. lowers) the CQI (channel quality indicator) it reports to the radio access network 101 to get a more robust MCS (modulation and coding scheme) to get a low BLER of the communication channel allowing higher audio quality. The reporting of the adapted CQI can be seen as indicating the channel quality to the communication network in a first way.

The UE 105 may select the amount of the adaptation of the CQI based on the observed BLER, such that, for example, the BLER expected after CQI adaptation is much smaller than the network's target BLER (of e.g. 10%).

The NodeB 103 adapts its modulation and coding scheme for the UE 105 based on the feedback of the UE 105, in this example the Channel Quality Indicator (CQI) according to LTE and UMTS/HSPA and the rates of acknowledgements (ACKs) and negative acknowledgements (NACKs) it receives from the UE in context of the HARQ method used. Based on the UE feedback the NodeB 103 chooses a modulation and coding scheme (MCS) which should result in the target BLER of 10%.

Since in this example it is assumed that the UE 105 wants a more robust reception (to improve the speech quality) with a lower BLER, it reports a lower CQI (which can be seen as faking channel conditions in the worse direction) to get a lower, i.e. more robust MCS. With this lower MCS, the voice (VoLTE) packet requires more resource elements. In a network (or cell) which is not fully loaded, this requirement for more resource elements is typically acceptable. In a fully loaded network the requirement for more resource elements may not be acceptable which is why in this example, the voice quality improving method is not applied when the radio cell is not detected to be not fully loaded.

Also, if e.g. the UE 105 has a parallel data or FTP transfer ongoing via the communication channel (i.e. this condition of the side conditions 404 is not fulfilled) the voice quality improving method is not applied (or the adaptation of the CQI may be limited with respect to the case of the side conditions being fulfilled), e.g. to ensure that each voice packet it transmitted in a single TTI (time transmission interval). Otherwise, a delay might be introduced if the voice packets are spread across multiple TTIs.

Figure 5:
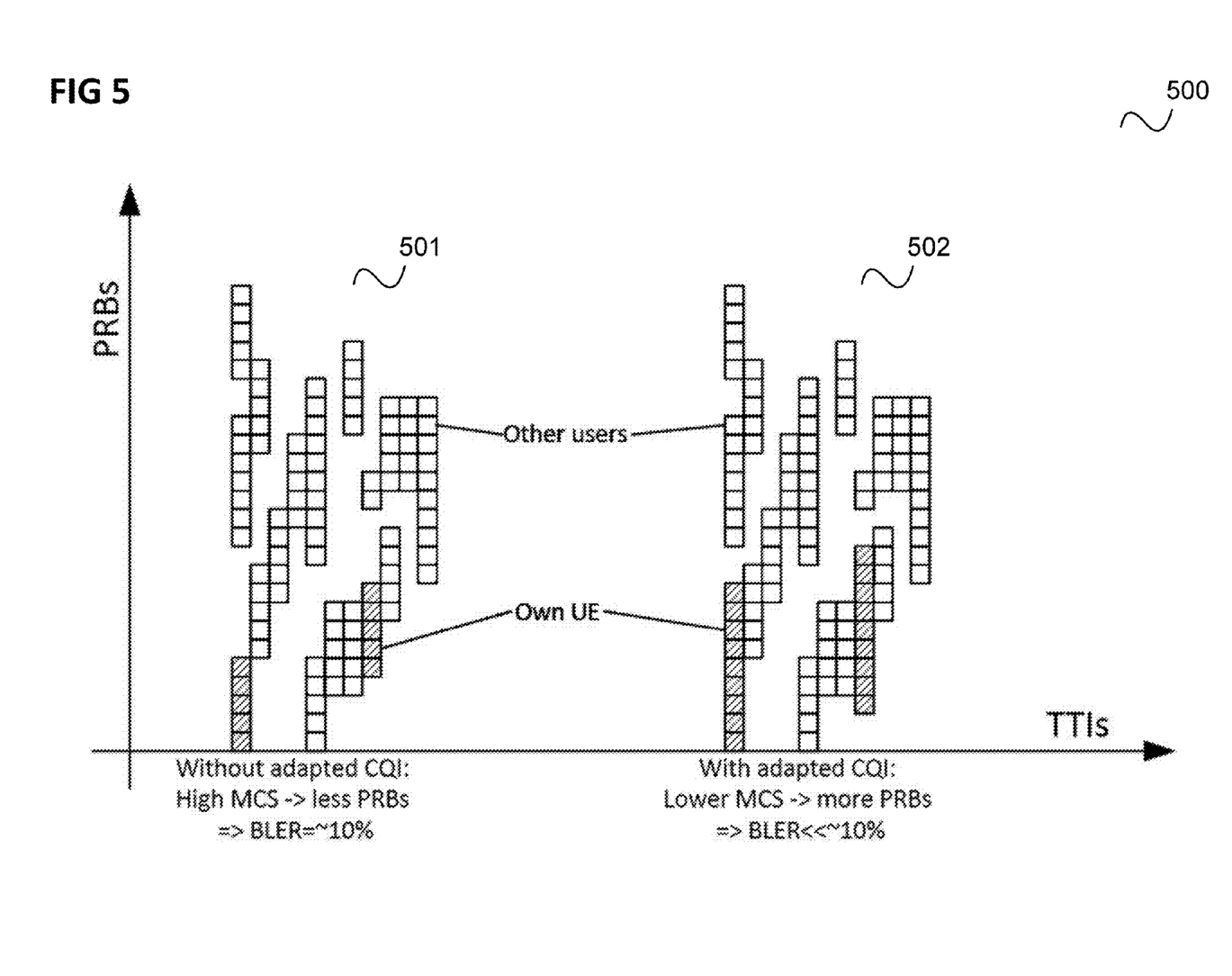
FIG. 5 shows a resource allocation diagram.

The effect on the scheduling map of a not fully loaded cell 104 of with the UE 105 reporting an adapted (i.e. lowered) CQI which in turn leads to a lowered (i.e. more robust) MCS according to which a higher number of physical resource blocks (PRBs) are allocated to the UE 105 is illustrated in FIG. 5.

FIG. 5 shows a resource allocation diagram 500.

The resource allocation diagram 500 shows a first resource allocation 501 as an example of a resource allocation without CQI adaptation and a second resource allocation 502 as an example of a resource allocation with CQI adaptation. For both resource allocations 501, 502, hatched boxes represent physical resource blocks allocated to the UE 105 and blank boxes represent physical resource blocks allocated to other mobile terminals (i.e. other users). As can be seen, there is no impact on the other users.

The UE 105 may report further feedback values like a rank indication to the base station 103 in the adaptation of 405 to get achieve a more robust downlink transmission, i.e. a more robust MCS.

The UE 105 for example uses an adaptation algorithm 406 (for the CQI or possibly one or more further feedback values) which may be based on various approaches, e.g. usage of a general fixed offset for the CQI, usage of an offset depending on the actual CQI and/or the current MCS, or an adaptive algorithm taking SNR, fading etc. into account.

In 407, the UE 105 detects whether the network applies a countermeasure to the adaptation of the reported CQI. For example, the UE 105 detects whether the NodeB 103 adapts the reported CQI on its side (e.g. increases the CQI on its side to get back to the original, i.e. actual CQI) and gets the UE back to the target BLER of e.g. 10%.

For example, the NodeB 103 may follow the UEs reported CQI and grant the UE 105 more PRBs with a more robust MCS. However, most NodeBs have an outer loop link adaptation (OLLA), which measures the BLER of a UE via the ACK/NACK reports of the UE. For example, the NodeB 103 may be configured to, if it detects a mismatch between the 10% target BLER and the measured BLER to apply an offset to the reported CQI to bring the communication channel to the UE 105 back to the target BLER. This countermeasure by the network would then cancel the effect of the CQI adaptation on the UE side. The countermeasure by the NodeB 103 can be detected by the UE 105 by comparing the transmitted CQI and the allocated MCS, possibly additionally taking the number of allocated PRBs and the BLER into account.

Accordingly, if UE 105 detects that the network applies a countermeasure the UE 105, in 408, increases a NACK rate of the target BLER (e.g. 10%), i.e. simulates the target BLER, to circumvent the countermeasure such that the UE still gets the lower BLER. The increasing of the NACK rate may be seen as indicating the channel quality to the communication network in a second way.

It should be noted that the UE 105 may measure the BLER resulting from the CQI adaptation with countermeasure from the network which may still be lower than the target BLER and may be acceptable for the UE 105. For example, only if the measured BLER is inacceptable for the UE 105, the UE 105 may increase the NACK rate.

In other words, if a network countermeasure is detected and the desire to adapt the CQI to improve speech quality as well as the condition of a not-fully loaded network still exists on the UE side, the UE 105 can apply a countermeasure on its own and pretend to the network a higher BLER (e.g. the target BLER of 10%) to avoid that the network applies its countermeasure or to achieve that the network takes it back.

In this example, the UE countermeasure to pretend a higher BLER to the network is done by adapting the ACK/NACK reporting by the UE 105 for the downlink (DL) packets. For simplicity, it is assumed that due to the more robust MCS (which was triggered by the lower CQI reported by the UE 105) the UE actually has a BLER of 0% on the DL, i.e. every packet is received without error in its first transmission. In this case, to adjust the target BLER, the UE 105 sends for the first transmission of every 10th downlink packet a NACK instead of an ACK, and sends an ACK only for first retransmission of these packets (i.e. every tenth packet). This is illustrated in FIG. 6.

Figure 6:
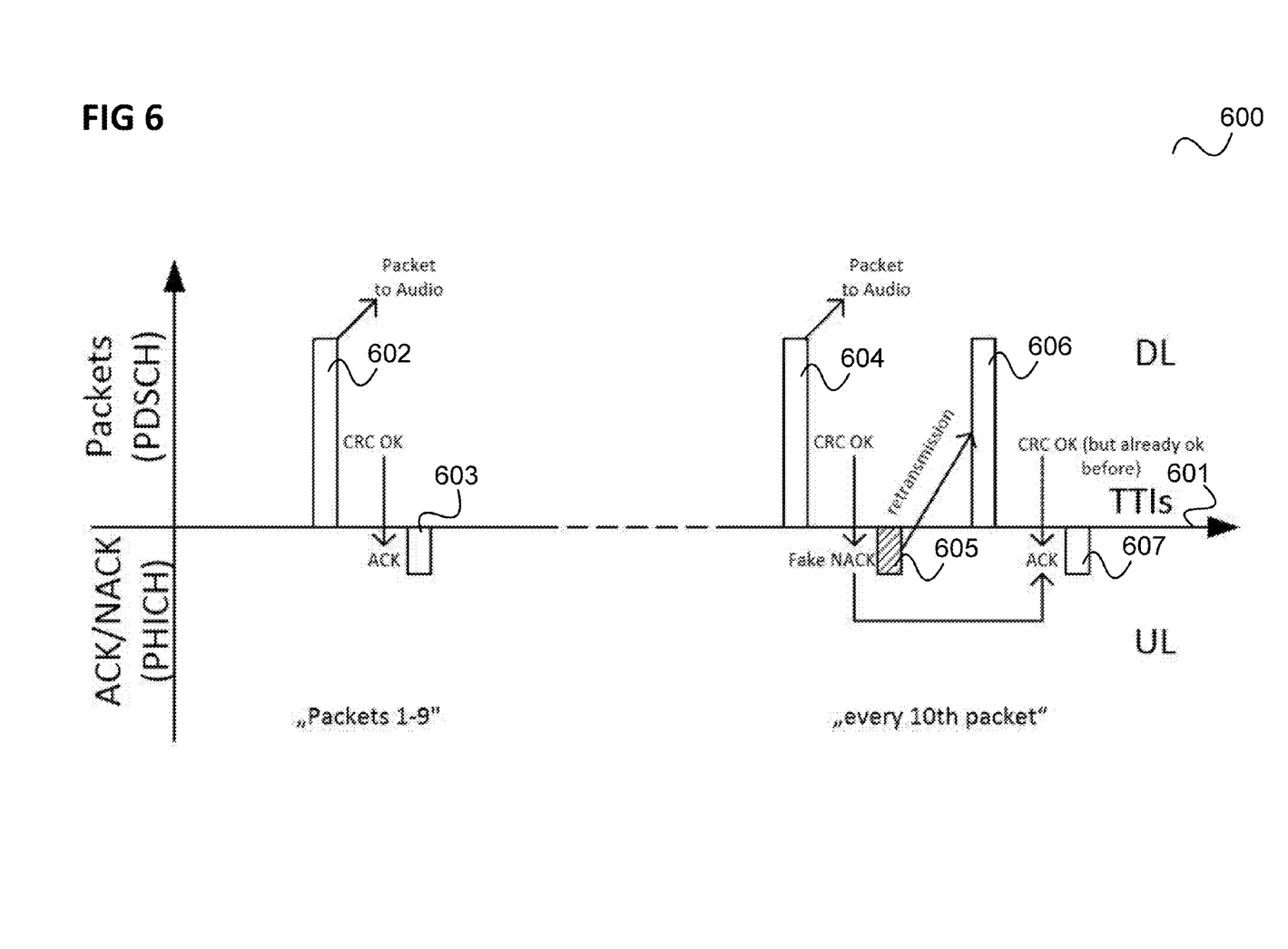
FIG. 6 shows a transmission diagram illustrating ACK and NACK transmission.

FIG. 6 shows a transmission diagram 600.

In FIG. 6, time increases from left to right along a time axis 601 and downlink transmissions are shown above the time axis 601 while uplink transmissions are shown below the time axis 601. For every packet 602 except for every tenth packet, the UE 105 sends an ACK message 603 to the base station 103 assuming that all these packets are received without error, i.e. a CRC (cyclic redundancy check) for the packet is positive.

For the first transmission of every tenth packet 604 which is also assumed to be received without error, the UE 105 sends a (additional) NACK message 605. This leads to a retransmission 606 of the packet in response to which the UE 105 sends an ACK message 607.

By this the network sees a 10% BLER and does not apply its countermeasure but rather assumes that the UE 105 needs the lower and more robust MCS. At the same time the UE 105 can keep its 0% BLER to ensure improved voice quality. If the actual BLER is different from 0% then the above artificial NACK insertion illustrated in FIG. 6 may be modified such that an average BLER of 10% (or the respective target BLER) is seen by the network, e.g. based on an adaptation algorithm 409.

It should be noted that the UE 105 may also not send additional NACK messages for precisely every tenth packet but may also send additional NACKs according to any other pattern such that in average, an additional NACK is sent with 10% probability. For example, the UE 105 may send additional NACKs such that a predetermined minimum or maximum distance is fulfilled between the NACKs (including both valid i.e. regular and additional NACKs). For example the UE 105 may avoid sending an additional NACK to close to a valid NACK to avoid a panic reaction by the base station.

Further, the UE 105 may for example generate additional NACKs for packets which have been received with worst quality. For example, the UE may use a decoder metric e.g. the number of turbo decoder iterations required for a packet, or the average soft bit quality or pre-decoder BER (bit error rate) of the packet which is a measure how close the reception of a packet was to fail. For the packets (e.g. 10% of the packets) with worst reception (i.e. reception closest to fail which may for example have been bad because the eNB decided to try to reduce quality for those) the UE may send additional NACKs.

While it may seem that the voice quality improvement increases power consumption of the UE 105 because the UE transmits additional NACKs 605, which implies that the UE needs to wake up (i.e. leave standby) to receive the retransmission 606 and send the ACK 607 for the retransmission this is typically not the case. The power consumption is mainly dominated by the on-time (of the RF and baseband circuits of the UE) and not e.g. the number of used PRBs per TTI or the MCS. Further, the target BLER of 10% the UE 105 would in general need to perform retransmissions for 10% of the packets, i.e. the same amount as with the additionally sent NACKs 605 in the above example. Therefore, the power consumption with voice quality improvement as described above can be expected to be approximately identical to the power consumption without voice quality improvement.

In addition, there is a potential for power saving in the voice quality improvement. For this, in 410, the UE 105 determines whether power saving is desired. This may also include a check whether the side conditions 404 (which may include less or more or different ones than the ones checked in 403 are fulfilled. If power saving is desired (and, if it is checked, if corresponding ones of the side conditions 404 are fulfilled), the UE 105, in 411, applies DTX (discontinuous transmission) and/or DRX (discontinuous reception) to transmissions and receptions that are not necessary.

Specifically, as every tenth packet was already received error free in the first transmission, the UE 105 does not need to wake up (or only for a shorter time) for the retransmission 606 since it has received the data already correctly with the first transmission of the packet 604. Thus, the UE 105 needs only to wake up to send the ACK 607 for the retransmission 606. Furthermore, the UE 105 also needs not to wake up to send the NACK for the first transmission 604 of the packet. If the UE 105 sends nothing here, this will be typically interpreted by the network as a NACK anyway. And if in the very rare case due to noise, the DTX in HARQ feedback (i.e. the omission of NACK message 605) for the first transmission 604 is interpreted as an ACK by the network, this has no negative impact as the packet was actually received correctly. This approach is illustrated in FIG. 7.

Figure 7:
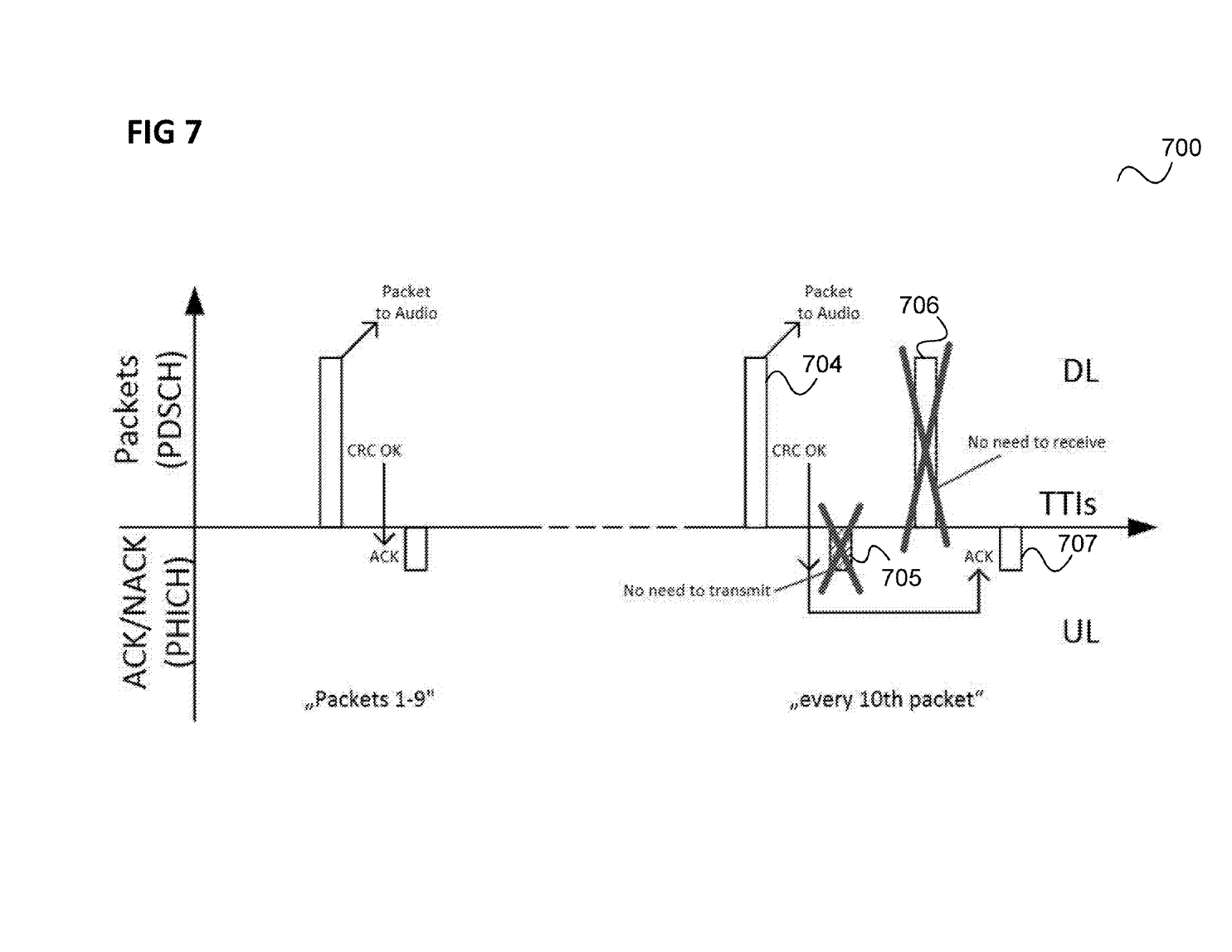
FIG. 7 shows a transmission diagram illustrating power saving by DTX and DRX.

FIG. 7 shows a transmission diagram 700 illustrating power saving by DTX and DRX.

As in FIG. 6, time increases from left to right along a time axis 701 and downlink transmissions are shown above the time axis 701 while uplink transmissions are shown below the time axis 701.

In comparison to FIG. 6, for the first transmission of every tenth packet 704 which is also assumed to be received without error, the UE 105 sends nothing in response, i.e. the (additional) NACK message 605 is omitted as illustrated by crossed-out NACK message 705. In other words, DTX is applied to the NACK message 605.

This still leads to a retransmission 706 of the packet which is however not received by the UE 105 to further save power as illustrated by crossed-out retransmission 706. In other words, DRX is applied to the retransmission 706. Still, the UE 105 sends an ACK message 707 in response to the retransmission 706.

With this power saving scheme approximately 9% of (modem) power can be saved with the simplifying assumption that power is proportional to on time. Namely, in the case of 10% BLER the UE 105 needs in average ten regular packets and one retransmitted packet (and the respective ten ACKs and one NACK) per ten audio packets. With the above case with 0% BLER only 10 packets and the respective ACKs/NACKs are needed (wherein the NACK may even be skipped as explained above), i.e. ~9% less.

It should be noted that skipping the transmission of a NACK by the UE 105 may not be ideal for the network, but as this will happen only rarely, the effect is somewhat similar to fading and thus can be expected to have little negative impact.

In the above description some simplifications are used to better illustrate the idea behind the above examples. For example, the target BLER may not be 10%. However, this can be detected by the UE 105 and it may change the measures of 405 and 408 accordingly (e.g. according to adaptation algorithms 406 and 409 which may take into account the target BLER of the network), e.g. adapt the NACK rate to match the target BLER.

It should be noted that by HARQ retransmission the chances are actually low that an audio packet is completely lost. However, one retransmission implies already a delay of approximately 8 ms, which, as measurements show, results in significant impact on jitter and delay of the 20 ms audio frames.

The above description was also simplified to the extent that only a speech communication service (e.g. VoLTE) was assumed to be active. If in parallel a data connection (e.g. a download service) is ongoing, the UE 105 may take this into account, e.g. may consider the activity pattern of the data connection, its BLER, its number of allocated resources etc. which may all be determined by the UE 105.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a determiner configured to adapt a channel quality indicator when a communication network serving cell is not fully loaded and when a communication service used by the communication terminal via a communication channel is of a predetermined class; and
   a transmitter configured to indicate the adapted channel quality indicator to the communication network.

2. The communication terminal of claim 1, wherein the transmitter is configured to indicate the channel quality to the communication network by transmitting a channel quality indicator corresponding to the channel quality.

3. The communication terminal of claim 1, wherein the transmitter is configured to indicate the channel quality to the communication network by transmitting acknowledgement messages at a rate corresponding to the channel quality.

4. The communication terminal of claim 1, wherein the transmitter is configured to indicate the channel quality to the communication network by transmitting negative acknowledgement messages for data packets or omitting acknowledgement messages and negative acknowledgement messages for data packets at a rate corresponding to the channel quality.

5. The communication terminal of claim 1, wherein the determiner is configured to determine the channel quality based on a candidate channel quality, wherein, if the communication service is of the predetermined class, the determiner reduces the candidate channel quality and determines the reduced candidate channel quality as the channel quality.

6. The communication terminal of claim 1, wherein the communication service is of the predetermined class if the data communicated by the communication service is of a predetermined data type.

7. The communication terminal of claim 6, wherein the predetermined data type includes speech data.

8. The communication terminal of claim 1, wherein the communication service is of the predetermined class if the data communicated by the communication service is real-time data.

9. The communication terminal of claim 1, wherein the predetermined class is a network layer or higher layer service class.

10. The communication terminal of claim 1, wherein the predetermined class is a transport layer or higher layer service class.

11. The communication terminal of claim 1, wherein the predetermined class is a class of real-time data transmission services.

12. The communication terminal of claim 1, wherein the predetermined class is a class of speech or voice data transmission services.

13. The communication terminal of claim 1, wherein the predetermined class is a class of voice calls.

14. The communication terminal of claim 1, wherein the predetermined class is a class of latency sensitive communication services.

15. The communication terminal of claim 1, wherein the predetermined class is a class of error rate sensitive communication services.

16. The communication terminal of claim 1, wherein the communication channel is provided by the communication network.

17. The communication terminal of claim 1, wherein the determiner is further configured to determine a load of the communication network and to determine the channel quality of the communication channel to be indicated to the communication network based on the load of the communication network.

18. A method for reporting a channel quality comprising:
    determining whether a communication service used by the communication terminal via a communication channel is of a predetermined class;
    determining a channel quality of the communication channel to be indicated to a communication network based on whether the communication service is of the predetermined class; and
    adapting a channel quality indicator when a communication network serving cell is not fully loaded and when a communication service used by the communication terminal via a communication channel is of a predetermined class;
    indicating the adapted channel quality indicator to the communication network.

* * * * *